March 8, 1966 W. R. FRIED 3,239,837
FREQUENCY MODULATED RANGE AND VELOCITY MEASURING INSTRUMENT
Filed Oct. 21, 1963 5 Sheets-Sheet 4

INVENTOR.
WALTER R. FRIED
BY
ATTORNEY.

March 8, 1966 W. R. FRIED 3,239,837
FREQUENCY MODULATED RANGE AND VELOCITY MEASURING INSTRUMENT
Filed Oct. 21, 1963 5 Sheets-Sheet 5

INVENTOR.
WALTER R. FRIED
BY
ATTORNEY.

United States Patent Office 3,239,837
Patented Mar. 8, 1966

3,239,837
FREQUENCY MODULATED RANGE AND VELOCITY MEASURING INSTRUMENT
Walter R. Fried, Briarcliff Manor, N.Y., assignor to General Precision, Inc., a corporation of Delaware
Filed Oct. 21, 1963, Ser. No. 317,444
4 Claims. (Cl. 343—9)

This invention relates to frequency modulated range and velocity measuring instruments, and more particularly to range and velocity measuring instruments employing high frequency radio waves transmitted from a fixed or moving frame to another frame for detecting the distance or range between the frames and their relative velocity.

The subject invention is particularly suitable for use in aircraft, missiles and any other vehicle having a velocity with respect to the earth or other object.

For some time now there has existed a demand for a single radio wave or radar device which would continuously and simultaneously furnish range and relative velocity between two objects such as an aircraft and the earth. With the increased use of helicopters and light planes operating in close proximity to the ground an accurate knowledge of absolute altitude or range to the ground and the relative velocity with respect to the ground is imperative.

This is almost an absolute requirement if full night use of the aircraft is desired since the accuracy of barometric altimeters is severely limited. It is of paramount importance that both the range and the velocity determining functions be performed by the same instrument since helicopters, light aircraft and missiles have a very limited weight carrying capacity. Therefore, any duplication of equipment to perform the two functions would severely limit the net load carrying capability of the vehicle.

Doppler navigation radars of different types have been developed and are extensively used in both civilian and military aircraft. In addition many different types of radio or radar altimeters have been developed and are in widespread use today. However, in no instance before this invention has a single instrument provided continuous and simultaneous range and velocity information.

A number of attempts to provide such an instrument have resulted in either failure and abandonment or have turned to a hydbrid system which employed sequential operation or duplicate systems for performing the two functions. Sequential operation is not suited to helicopter or low terrain following operations since it results in a large range error which limits the usefulness of the instrument. Duplicate systems are also unsuited for this type of operation because they occupy too much space and limit the load capability of the vehicle.

The major reasons for the failures and compromises are the incompatabilities of certain critical radar parameters for the velocity and altitude measurements. Notable among these are the pulse repetition frequency in pulse systems and the modulation frequency in frequency modulated continuous wave systems. Specifically, altitude and velocity ambiguities as well as loss of accuracy have been typical problems in the previous attempts.

One object of this invention is to provide an integrated velocity and range measuring radar instrument which employs a single receiver transmitter to provide both range and velocity information.

Another object of this invention is to provide an integrated velocity and range measuring radar instrument in which the velocity and range information are simultaneously and continuously available.

A further object of the invention is to provide a device as set forth above which is low in weight, occupies little space and is inexpensively manufactured.

In accordance with the invention, a single signal generating, transmitting and receiving apparatus is used in conjunction with two simultaneously operating signal processing channels for continuously deriving range and velocity information respectively.

The foregoing and other objects and advantages of the invention will become more apparent from a consideration of the drawings and specification, wherein one embodiment of the invention is shown and described in detail for illustration purposes only.

Figure 1:
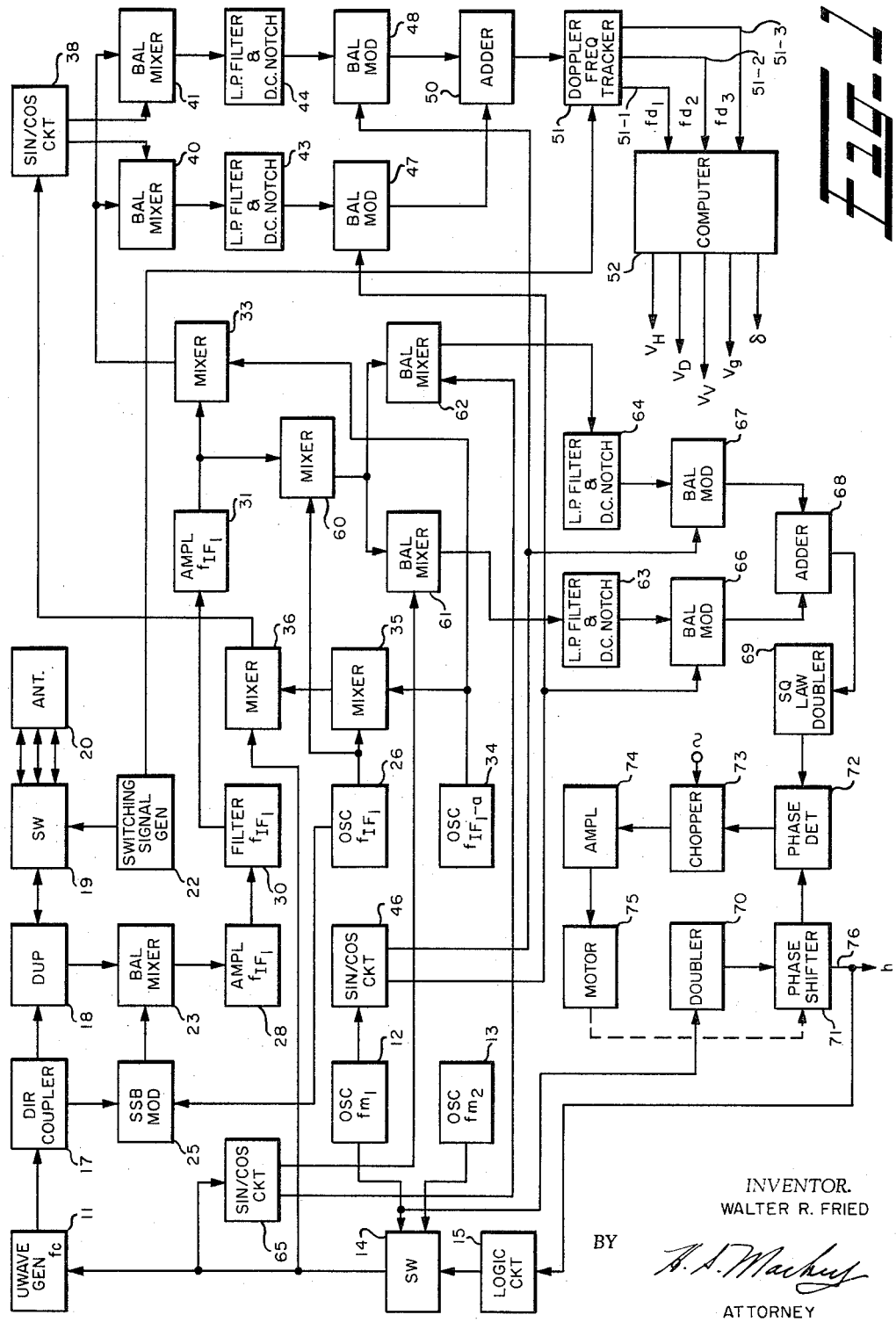
FIG. 1 is a schematic drawing of a novel integrated range and velocity measuring radar constructed in accordance with the invention.

FIG. 1 is a simplified block diagram of a complete range and velocity determining system constructed in accordance with the invention and employs a microwave generator 11 operating at a frequency $f_c$ which may use a low-power klystron or a varactor multiplier power service. This circuit is frequency modulated by an oscillator 12 or an oscillator 13 depending upon the particular altitude at which the system is operating. Oscillator 12 has an output frequency $f_{m1}$, while oscillator 13 has a frequency $f_{m2}$. Both oscillators are connected to the microwave power source 11 by a switch 14 which is under the control of a logic circuit 15 which operates as a function of altitude in a manner which will be described in detail later.

Figure 2:
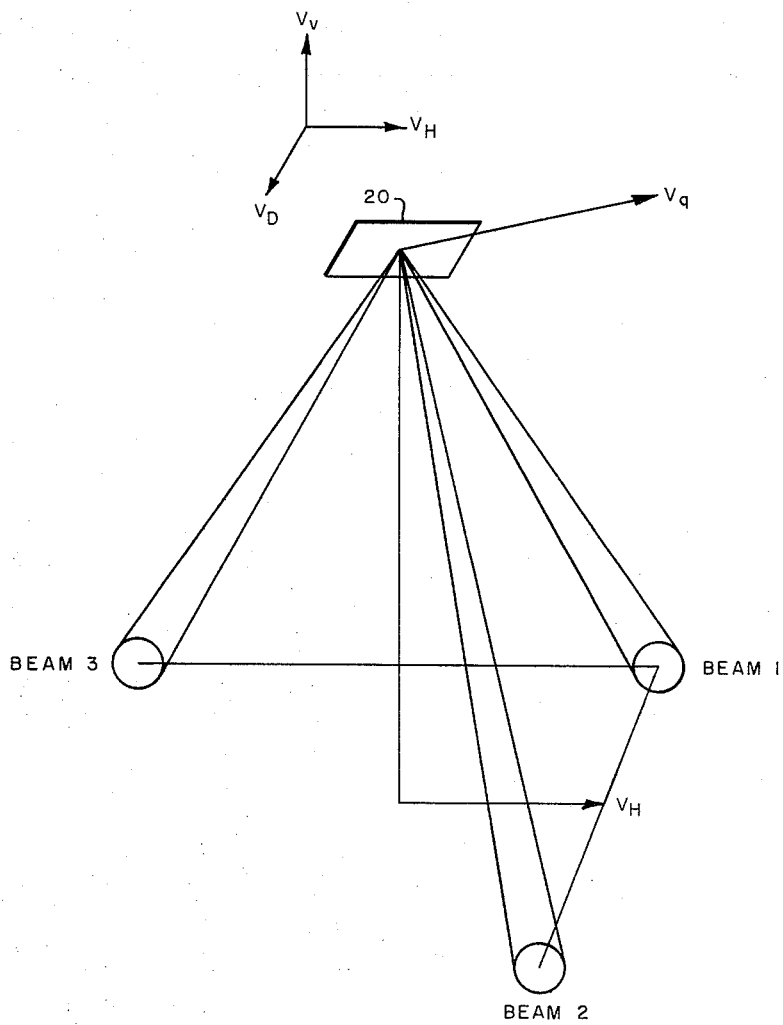
FIG. 2 is an isometric view of the beam pattern radiated by the antenna shown in FIG. 1; and, FIGS. 3 through 13 are graphs illustrating the operation of the circuit shown in FIG. 1.
Figure 3:
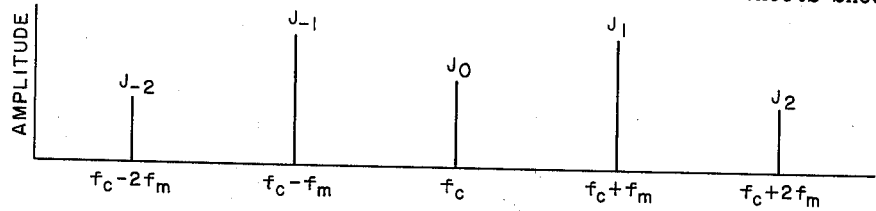

The output of microwave generator 11 is shown graphically in FIG. 3 and consists of a fundamental at frequecy $f_c$ with sidebands at $f_c \pm f_m$ and $f_c \pm 2f_m$. Other higher order sidebands are not shown in the graph. This FIG. 3, therefore, constitutes a graphical representation of the Bessel function of the frequency modulated wave in which $J_0$ represents the carrier or zero order sideband, $J_1$ the first order sideband and $J_2$ the second order sideband. In this instance $f_m$ stands for the frequency of either oscillator 12 or 13 depending on the instantaneous altitude. The frequency modulated microwave signals from microwave generator 11 are fed through a directional coupler 17, a duplexer 18 and a switch 19 to an antenna 20. Antenna 20 may be of any variety, however, a slotted planar array antenna appears to be best suited for this application since by proper phasing the antenna may be made to sequentially generate several beams from the same aperture and thus supply all the necessary information with a relatively small and inexpensive antenna. Alternatively, a cluster of parabolic reflectors may be used. While a cluster of parabolic reflectors is lower in cost than a slotted planar array it is, however, bulky and occupies more space than a slotted planar array antenna. A switching signal generator 22 provides signals to switch 19 which causes antenna 20 to sequentially radiate three beams which are shown in FIG. 2. The signal radiated by antenna 20 is backscattered by the scattering surface and received by the same antenna. The received signal is fed through the antenna switch 19, duplexer 18 to a balanced mixer 23.

Figure 4:
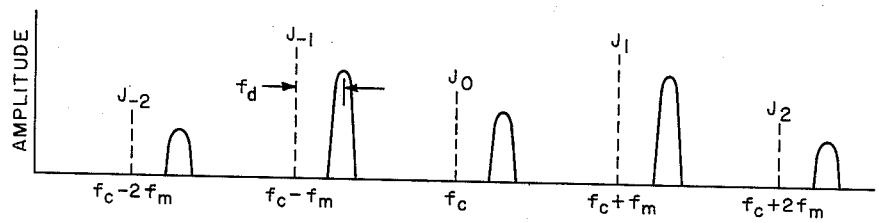
Figure 5:
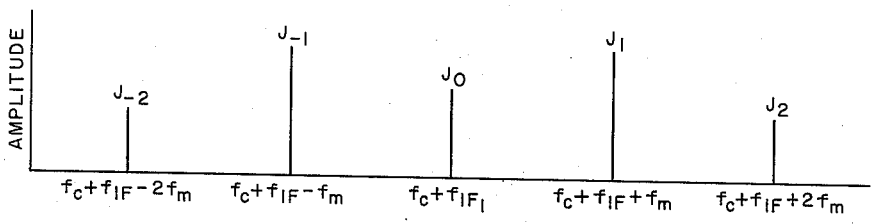
Figure 6:
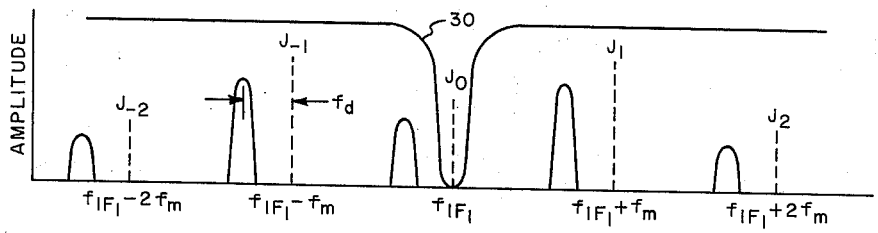

A small amount of the frequency modulated signal from microwave generator 11 is tapped via directional coupler 17 and applied to a single sideband modulator 25. In addition the output of an oscillator 26 at a frequency $IF_1$ is also applied to single sideband modulator 25. The output of single sideband modulator 25 is applied to balanced mixer 23 where it is mixed with the return from antenna 20. FIGS. 4 and 5 show respectively the return signal from antenna 20 and the output of single sideband modulator 25. Balanced mixer 23 converts the return signal to a first intermediate frequency $f_{IF_1}$ and provides an output signal in the form shown in FIG. 6. This signal includes energy in the region of frequency $f_{IF_1}$ which is amplified in an amplifier 28. Since the transmitted signal and hence any leakage signal and the local oscillator signal are frequency modulated at a difference frequency of $f_{IF_1}$, a large $f_{IF_1}$ spike will appear at the output of amplifier 28. Therefore, the signal at the output of the amplifier 28 is applied to a filter 30 centered at $f_{IF_1}$. The characteristics of the filter are shown in FIG. 6 and removes the spike previously mentioned. After filtering the signal is again amplified in an amplifier 31. The output of amplifier 31 is split into two signal channels. The first channel provides velocity information and the second altitude or range.

Figure 7:
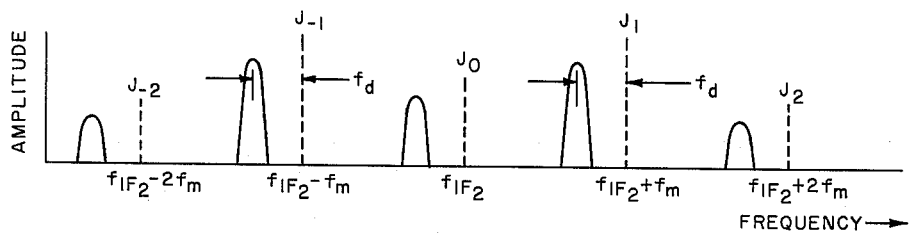

In the velocity channel the output of the amplifier 31 is applied to a mixer 33, and mixed with a second offset frequency $(f_{IF_1}-a)$ from an oscillator 34 to provide an output at mixer 33 shown graphically in FIG. 7. Mixer 33 in conjunction with oscillator 34 changes the intermediate frequency of the signal to $f_{IF_2}$ from $f_{IF_1}$.

In describing the remainder of the circuit of FIG. 1, it would be helpful to use numerical values for the various frequencies, therefore, the actual frequencies used in a system constructed in accordance with FIGURE 1 are set forth below:

(1)           $f_c = 13.325$ KMC/S
(2)           $fm_1 = 21$ KC/S
(3)           $fm_2 = 126$ KC/S
(4)           $f_{IF_1} = 30$ MC/S
(5)           $f_{IF_1} - a = 29.748$ MC/S

In the description which follows the above numerical frequencies will be used in place of the general or alphabetic designation. However, it should be remembered that, the actual frequencies employed may be varied over a wide range and need not be limited to the actual numerical values set forth above.

The outputs of oscillators 26 and 34 are applied to a mixer 35 which provides an output, in the case being described, at 252 KC/S. This output is applied to another mixer 36 along with the signal at the output of switch 14 which as previously described will be either 21 KC/S or 126 KC/S. Thus, the output of mixer 36 will be 231 KC/S or 126 KC/S depedending on the condition of switch 14 which is controlled as a function of altitude by circuit 15. The output of mixer 36 is applied to sine/cosine circuit 38 which provides the sine and cosine functions of the output of mixer 36. Circuit 38 may be no more than a 90-degree phase shifting circuit, for providing the cosine function, the sine function being supplied directly by mixer 36. The particular notation used was selected since it appears to fit the general arrangement better and conveys the desired information in a form more easily recognized.

Mixer 33 is connected directly to a pair of identical balanced mixers 40 and 41 which are also connected to circuit 38. Mixer 40 receives the sine function while 41 receives the cosine function. Each mixer provides an output shown graphically in FIG. 8 which are identical except for phase. In effect mixers 40 and 41 fold the spectrum shown in FIG. 7 at $f_{IF_2} - fm$ which will, in the example given, be at 231 KC/S or 126 KC/S depending on the altitude of operation.

Figure 8:
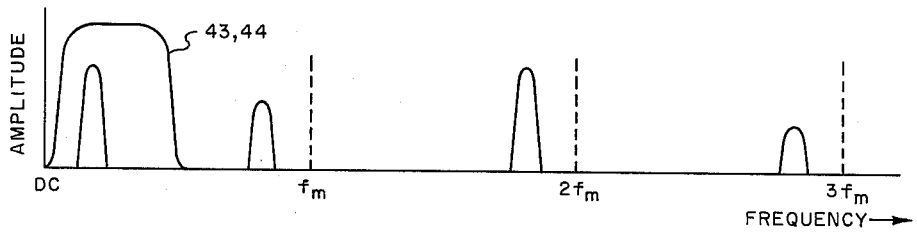

A pair of identical low pass and D.C. notch filters 43 and 44, the characteristics of which are shown graphically in FIG. 8, are connected to mixers 40 and 41, respectively. These filters pass only the lower first sideband $J_{-1}$ and in addition eliminate any leakage at $(f_{IF_2} - fm)$ which as previously stated may be 231 or 126 KC/S.

Since mixers 40 and 41 fold the spectrum (FIG. 7) at $(f_{IF_2} - fm)$ and beat the foldover frequency down to zero cycles, the D.C. notch portion of the filter eliminates the leakage at the foldover or zero frequency while the low pass portion of the filter eliminates all but the lower first sideband $J_{-1}$.

Figure 9:
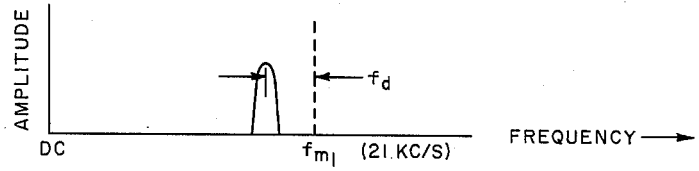

The output of oscillator 12 at 21 KC/S is applied to a circuit 46 which is identical in function to circuit 38 and provides the sine and cosine functions of the output of oscillator 12. The sine function of 21 KC/S is applied to a balanced modulator 47 along with the output of circuit 43 while the cosine function is applied to a similar balanced modulator 48 along with the output of circuit 44. An adding circuit 50 combines the outputs of balanced modulators 47 and 48 to provide an output shown graphically in FIG. 9. The addition of the outputs from balanced mixers 47 and 48 in adding circuit 50 recreates the first lower $J_{-1}$ sideband of the signal from mixer 33. However the Doppler shifted lower sideband is always displaced from $(fm_1)$ 21 KC/S instead of $(f_{IF_2} - fm)$.

The output of adding circuit 50 contains the velocity information since the deviation of the center of the signal from the reference frequency of 21 KC/S designated $f_d$ on the graph is the well known Doppler shift and is proportional to the velocity. The antenna as previously stated sequentially emits three beams illustrated in FIG. 2. Thus, the output of circuit 50 provides three sequential outputs $fd_1$, $fd_2$ and $fd_3$ for each of the three beams transmitted. A Doppler frequency tracker 51 connected to the output of circuit 50 provides continuous outputs of $fd_1$, $fd_2$ and $fd_3$. A switching function within tracker 51 is performed in response to the output of switching signal generator 22 which also switches the antenna beams.

FIG. 2 discloses the beam pattern radiated by antenna 20. The three beams are radiated sequentially and in order under the control of switching signal generator 22. In addition generator 22 provides a switching control function for the tracker 51. Three storage integrators and tracking oscillators are included in tracker 51, which respond to inputs $fd_1$, $fd_2$ and $fd_3$, so that outputs of frequencies or pulse beams of frequency $fd_1$, $fd_2$ and $fd_3$ are continuously available on conductors 51–1, 51–2 and 51–3, respectively.

These three signals $fd_1$, $fd_2$ and $fd_3$ provide sufficient information to compute the heading velocity $V_H$, the cross heading velocity $V_D$, the vertical velocity $V_V$, the ground track velocity $V_g$ and the drift angle $\delta$ which is the angular difference between the heading velocity vector and the ground track velocity vector.

The following equations set forth the computations required to determine the above quantities from the known information.

(6)         $V_H = K_H (fd_1 - fd_3)$
(7)         $V_D = K_D (fd_1 - fd_2)$
(8)         $V_V = K_V (fd_2 + fd_3)$

Where $K_H$, $K_D$ and $K_V$ are constants containing the transmitted wave lengths and the beam looking angles for the beam configuration illustrated in FIG. 2. Specifically:

(9)         $K_H = \dfrac{1}{4\lambda \cos\theta \cos\alpha}$

(10)       $K_D = \dfrac{1}{4\lambda \cos\theta \sin\alpha}$

(11)       $K_V = \dfrac{1}{4\lambda \sin\theta}$

Where $\theta$ is the depression angle of the antenna beams, $\alpha$ is the projected azimuth angle of the antenna beams (i.e., smallest angle between the projections of the longitudinal axis of the aircraft and the antenna beam on the ground plane), and λ is the wave length of transmission.

Once $V_H$ and $V_D$ are computed $V_g$ and $\delta$ the ground track velocity vector atnd the drift angle, respectively, may be determined by a conventional tangent solver since $V_g$ is the resultant of orthogonal vectors $V_H$ and $V_D$. The three outputs of the tracker 51 are applied to a computer 42 for determination of the velocity as set forth above. No details of the computer are disclosed since it forms no part of the subject invention. However it is generally disclosed to illustrate to what use the outputs $fd_1$, $fd_2$ and $fd_3$ from tracker 51 may be put.

Figure 10:
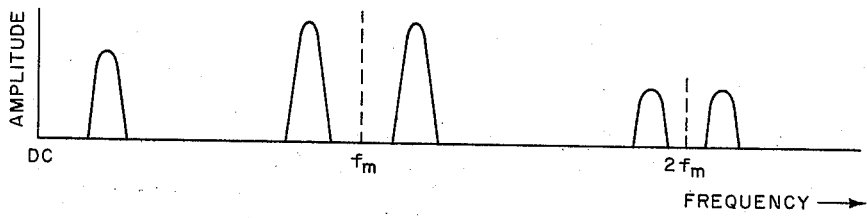
Figure 11:
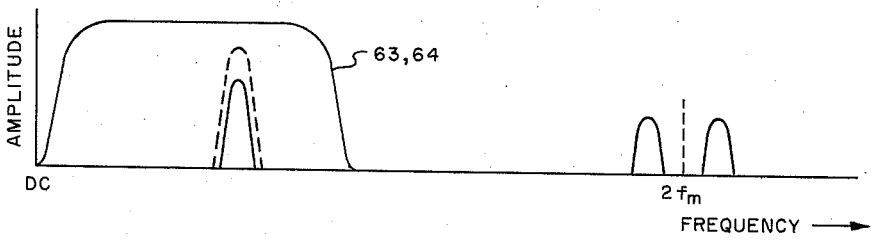

The output of amplifier 31, see FIG. 6, is also connected to a mixer 60 which in addition is connected to oscillator 26 to provide an output illustrated graphically in FIG. 10. Mixer 60 folds the spectrum shown in FIG. 6 at $f_{IF_1}$ which in this instance is 30 MC/S. The signal from mixer 60 is applied to a pair of identical balanced mixers 61 and 62 which are identical to mixers 40 and 41 previously described. However, balanced mixers 61 and 62 are connected to a circuit 65 which provides sine and cosine functions of the modulating frequency. The modulating frequency in use is picked up at the output of switch 14. Thus the sine function of (21 or 126) KC/S is applied to balance mixer 61 while the cosine function of (21 or 126) KC/S is applied to balanced mixer 62. Here again the particular frequency applied 21 or 126 KC/S is a function of absolute altitude or range and is controlled by circuit 15 as previously stated. The output of mixers 61 and 62 is illustrated in FIG. 11 and differs in one very important respect from the output of mixers 40 and 41. Since the folding takes place at $fm$ (21/126) KC/S both the lower and upper first sidebands $J_1$ and $J_{-1}$ are present in the mixer outputs. This difference is in addition to other differences which arise due to the different treatments of the signal prior to the input to mixers 61 and 62.

A pair of low pass and D.C. notch filters 63 and 64 similar to filters 43 and 44, previously described, are connected to mixers 61 and 62, respectively, and pass the first order sidebands only. In addition, these filters block leakage at zero frequency due to the D.C. notch characteristics of the filter.

Figure 12:
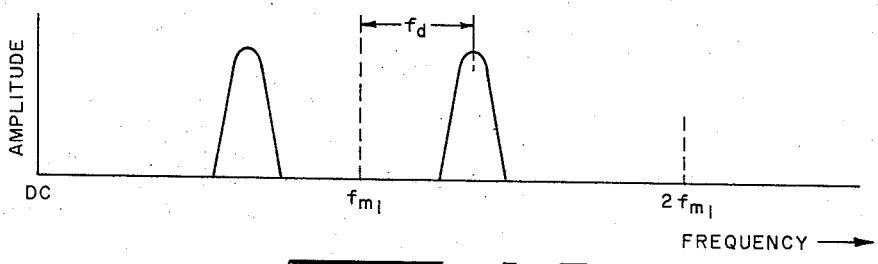

Two identical balanced modulators 66 and 67 are connected to filters 63 and 64, respectively, and to oscillator 12 via circuit 46, previously described, and perform the same functions as modulators 47 and 48. Here however since both the upper and lower first sidebands were included in the output of mixers 61 and 62 both are recreated by modulators 66 and 67 when their outputs are added in adding circuit 68 the output of which is illustrated in FIGURE 12. Both sidebands are equally spaced by $f_d$ on opposite sides of ($fm_1$) 21 KC/S.

This signal contains the altitude or range information since the phase shift of this signal with respect to the phase of oscillator 12 is a function of range. The signal is frequency doubled in a square law doubling circuit 69 which provides the output illustrated in FIGURE 13. The doubling results in a large spike at $2fm_1$) 42 KC/S. It is the phase of this signal which is compared with the phase of oscillator 12.

In order to accomplish the phase comparison, the output of oscillator 12 is frequency doubled in a circuit 70 and applied through a phase shifter 71 to one input of a phase detector 72 which has its other input connected to circuit 69. Phase detector 72 provides a D.C. output having a magnitude and polarity corresponding to the magnitude and direction, respectively, of the phase shift between the signals from phase shifter 71 and square law doubler 69.

The D.C. error signal from detector 72 is applied to a chopper 73 where it is converted to an alternating signal the magnitude of which corresponds to the amount of phase shift and the phase of which corresponds to the direction of shift. This alternating error signal is amplified in a circuit 74 and then applied to a servo motor 75 which controls phase shifter 71. The motor 75 adjusts shifter 71 in such a direction as to null the output from detector 72. Thus, the output on conductor 76 represents the altitude "$h$" of the antenna 20 above the reflecting surface. In addition the position of the output shaft of motor 75 also indicates the absolute altitude or range between antenna 20 and the reflecting or back scattering surface.

Logic circuit 15 receives the output of shifter 71 on conductor 76 and controls switch 14 to select oscillator 12 or 13 depending on the actual range to the ground or target. Two modulating frequencies are employed to improve the sensitivity of the altitude or range measurement at short distances by employing a higher frequency below about 2,000 feet.

*Operation*

A signal having the form shown graphically in FIGURE 3 is radiated by antenna 20 toward the ground or target. If there is relative motion between the antenna and the target the reflected signal received by the antenna will be altered as shown in FIGURE 4 where the line frequencies at $f_c$, $f_c \pm f_m$ and $f_c \pm 2f_m$ will be shifted an amount $f_d$ due to the relative motion between the antenna and the reflecting or backscattering surface. In addition, the pure line frequencies radiated will acquire a finite width and a substantially gaussian, noise-like shape due to the beam width of the antenna and the random, noise-like nature of the back scattering or reflection phenomenon.

The transmitted signal is converted in single sideband modulator 25, the output of which is shown graphically in FIGURE 5. This output is mixed in balanced mixer 23 with the reflected energy (FIG. 4) to convert the reflected or backscattered Doppler shifted signal to the intermediate frequency $f_{IF_1}$ and is shown graphically in FIGURE 6. Filter 30 eliminates the large spike at frequency $f_{IF_1}$. This signal is amplified and split into two channels for detecting the velocity and altitude information, respectively, contained in the signal.

In the velocity channel the signal shown in FIG. 6 is mixed with the offset frequency from oscillator 34 ($f_{IF_1}-a$) and this converts the signal from the first intermediate frequency $f_{IF_1}$ to a second intermediate frequency $f_{IF_2}$ (FIG. 7) which equals the difference between $f_{IF_1}$ and $f_{IF_1}-a$ or (a). In the example set forth above the first intermediate frequency is 30 MC/S while the second intermediate frequency is 252 KC/S.

This signal (FIG. 7) is split into two channels which are structurally identical but operate in quadrature. The signal (FIG. 7) is separately mixed with the sine and cosine function of ($a-f_m$) which in the example will be 231 or 126 KC/S depending on the value of $f_m$ as determined by the range or altitude. This mixing causes a foldover of the spectrum illustrated in FIG. 7 by beating ($f_{IF_2}-f_m$) down to zero frequency, namely producing foldover at 231 or 126 KC/S in the numerical example and provides the output shown in FIG. 8. Filters 43 and 44 eliminate all the energy except the first lower ($J_{-1}$) sideband (see filter characteristics FIG. 8). The two outputs appear identical, however, their phases are at quadrature. They are remodulated in balanced modulators 47 and 48 with the sine and cosine functions, respectively, of $fm_1$ or 21 KC/S, in the example, from oscillator 12 and added in circuit 50 to provide the output illustrated in FIGURE 9.

This output contains the necessary velocity information and comprises a substantially gaussian, noise-like signal, the center of which is displaced $f_d$ cycles from $fm_1$ or 21 KC/S in the example. Here $f_d$ is the Doppler shift frequency and is a function of the relative velocity between the antenna and the target which backscatters the radiation from the antenna. The frequency $f_d$ for each antenna beam is measured in the frequency tracker 51 and its outputs, pure sinewaves at frequencies $fd_1$, $fd_2$ and $fd_3$ may be utilized, as previously explained, to compute the vertical, along heading, cross heading and ground track velocities of the antenna as well as the drift angle whenever a sequential three-beam configuration, as shown in FIGURE 2, is employed.

The altitude channel also utilizes the signal illustrated in FIGURE 6. This signal is mixed with $f_{IF_1}$ from oscillator 26 and beats $f_{IF_1}$ (FIG. 6) down to zero frequency to convert the signal to the form shown in FIGURE 10.

This signal (FIG. 10) is split into two channels which are structurally identical but operate in quadrature. The signal (FIG. 10) is separately mixed with the sine and cosine functions of $f_m$ which in the example will be 21 or 126 KC depending on the altitude or range. The mixing causes a foldover at $f_m$ (21/126 KC/S) by beating $fm$ down to zero frequency to provide the output illustrated in FIGURE 11. Filters 63 and 64 eliminate all the enery except the upper $J_{+1}$ and lower $J_{-1}$ sidebands.

The filter outputs are remodulated in balanced modulators 66 and 67 with sine and cosine functions, respectively, of $fm_1$ or 21 KC/S, in the example. The remodulated signals are added in circuit 68 to provide the output illustrated in FIG. 12. Here both lower and upper sidebands appear since they were both present at the input to balanced mixers 61 and 62, see FIG. 10 and FIG. 11 where the lower $J_{-1}$ sideband is indicated in dashed line.

Figure 13:
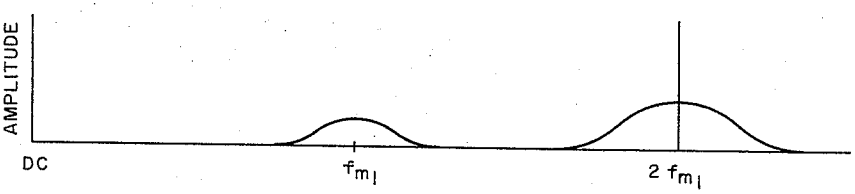

Square law doubling circuit 69 accepts the output of adder 68 (FIG. 12) and provides the output illustrated in FIGURE 13. This output contains a large spike at $2fm_1$ (42 KC/S) which is due to the heterodyning process. It is the comparison of the phase of this spike and the doubled frequency of oscillator 12 which provides the altitude information. The servo system, including chopper 73, amplifier 74 and motor 75, implement the measurement by the well-known null technique. The altitude information derived from phase shifter 71 in addition to its normal use is applied to logic circuit 15 to control the selection of the optimum modulating frequency for the particular range of operation in order that the sensitivity of the altitude reading may be optimized as previously pointed out.

While only one embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A range and velocity measuring instrument comprising,
   a microwave generator,
   an oscillator providing a preselected frequency output for frequency modulating the microwave generator output,
   a microwave duplexer means responsive to the frequency modulated microwaves for applying said waves to an antenna arranged to radiate said frequency modulated waves toward a target and for simultaneously applying the Doppler shifted microwaves reflected by the target and received by the antenna to first and second signal processing channels for extracting range and velocity information, respectively, from the Doppler shifted waves,
   said first signal processing channel for determining range including, means for mixing the signal received from the duplexer with a signal having a frequency equal to the zero order sideband frequency of the signal received from the duplexer whereby the received spectrum is folded at the microwave generator frequency and corresponding pairs of sidebands are spaced equally above and below multiples of the modulating frequency, means for passing one pair of sidebands only, a square law frequency doubling circuit responsive to the passed sideband pair for providing a large spike of energy at twice the average frequency of the said passed sideband pair, frequency multiplying means for multiplying the modulating frequency to render it equal in frequency to the said spike, and means for comparing the phase of the spike and the multiplied modulating frequency to supply a signal corresponding to the phase difference therebetween which is proportional to the range between the target and the antenna, and
   said second signal processing channel for determining a component of the relative velocity between the target and the antenna including, means for selecting a preselected sideband frequency of the received signal and a frequency tracking circuit responsive to the preselected sideband for supplying a single frequency representative of the displacement of the center frequency of the selected noise-like Doppler shifted signal from a reference frequency which displacement correspond to a component of the relative velocity between the antenna and the target.

2. A range and velocity measuring instrument comprising,
   a microwave generator,
   an oscillator providing a preselected frequency output for frequency modulating the microwave generator output,
   a microwave duplexer means responsive to the frequency modulated microwaves for applying said waves to an antenna arranged to radiate said frequency modulated wave toward a target and for simultaneously applying the Doppler shifted microwaves reflected by the target and received by the antenna to first and second signal processing channels for extracting range and velocity information, respectively, from the Doppler shifted waves,
   said first signal processing channel for determining the range including, means for mixing the signal received from the duplexer with a signal having a frequency equal to the zero order sideband frequency of the signal received from the duplexer whereby the received spectrum is folded at the microwave generator frequency and corresponding pairs of sidebands are spaced equally above and below multiples of the modulating frequency, means for passing one pair of sidebands only, a square law frequency doubling circuit responsive to the passed sideband pair for providing a large spike of energy at twice the average frequency of the said passed sideband pair, frequency multiplying means for multiplying the modulating frequency to render it equal in frequency to the said spike, and means for comparing the phase of the spike and the multiplied modulating frequency to supply a signal corresponding to the phase difference therebetween which is proportional to the range between the target and the antenna, and
   said second signal processing channel for determining a component of the relative velocity between the target and the antenna including, means for mixing the received signal with a signal having a frequency equal to that of a preselected sideband frequency of the received signal whereby the Doppler shifted signal associated with that sideband is reduced in frequency to the audio range, means for passing only the Doppler shifted signals in the said audio range of frequencies, means for modulating the audio signal with a fixed frequency, and a frequency tracking circuit for supplying a single frequency representative of the displacement of the center frequency of the noise-like Doppler shifted signal from the said fixed modulating frequency which displacement corresponds to a component of the relative velocity between the antenna and the target.

3. A range and velocity measuring instrument comprising, a microwave generator, an oscillator providing a preselected frequency output for frequency modulating the microwave generator output, a microwave duplexer means responsive to the frequency modulated microwaves for applying said waves to an antenna arranged to radiate said frequency modulated wave toward a target and for simultaneously applying the Doppler shifted microwaves reflected by the target and received by the antenna to first and second signal processing channels for extracting range and velocity information, respectively, from the Doppler shifted waves, said first signal processing channel for determining the range including means for mixing the signal received from the duplexer with a signal having a frequency equal to the zero order sideband frequency of the signal received from the duplexer whereby the received spectrum is folded at the microwave generator frequency and corresponding pairs of sidebands are spaced equally above and below multiples of the modulating frequency, means for passing the first sideband pair only, a square law frequency doubling circuit responsive to the first sideband pair for providing a large spike of energy at twice the average frequency of the said first sideband pair, means for frequency doubling the modulating frequency to render it equal in frequency to the said spike, and means for comparing the phase of the spike and the multiplied modulating frequency to supply a signal corresponding to the phase difference therebetween which difference is proportional to the range between the target and the antenna, and said second signal processing channel for determining a component of the relative velocity between the target and the antenna including, means for mixing the received signal with a signal having a frequency equal to that of the first sideband frequency of the received signal whereby the Doppler shifted signal associated with that sideband is reduced in frequency to the audio range of frequencies, means for passing only the Doppler shifted signals in the said audio range of frequencies, means for modulating the audio signal with a fixed frequency, and a frequency tracking circuit for supplying a single frequency representative of the displacement of the center frequency of the noise-like Doppler shifted signal from said fixed modulating frequency which displacement corresponds to a component of the relative velocity between the antenna and the target.

4. A range and velocity measuring instrument comprising, a microwave generator, an oscillator providing a preselected frequency output for frequency modulating the microwave generator output, to provide a center frequency at the microwave generator frequency and plurality of upper and lower sidebands, a duplexer responsive to the frequency modulated microwaves for applying said waves to an antenna arranged to radiate the waves toward a target and simultaneously supplying the Doppler shifted waves reflected by the target and received by the antenna to a separate output, first converting means responsive to the Doppler shifted waves at the separate output of the duplexer for converting said Doppler shifted waves to a first intermediate frequency, a first signal processing channel for extracting a signal corresponding to a component of the relative velocity between the target and the antenna from the converted Doppler shifted microwaves comprising, means for mixing the converted Doppler shifted microwave with a signal having a frequency equal to the converted first lower sideband frequency whereby the microwave spectrum is folded at the said converted first lower sideband frequency, filter means for passing the Doppler shifted first lower sideband of the folded spectrum only, modulating means for modulating the first lower sideband with a preselected frequency, and a frequency tracker for providing a signal corresponding to the displacement of the center frequency of the Doppler shifted first lower sideband from the preselected modulating frequency which signal is proportional to a component of the relative velocity between the antenna and the target, and a second signal processing channel for extracting a signal corresponding to the range between the antenna and the target from the converted Doppler shifted microwaves comprising, means for mixing the converted Doppler shifted microwave with a signal having a frequency equal to the converted center frequency whereby the converted microwave spectrum is folded at the said converted center frequency, filter means for passing the first upper and lower sidebands only of the converted Doppler shifted microwave spectrum, means for frequency doubling the output of the filter means whereby a large spike having a frequency equal to twice the average frequency of the first upper and lower sidebands is provided, means for frequency doubling the output of the oscillator which modulates the microwave generator, and phase comparison means for detecting the total phase shift between the doubled frequencies and for supplying a signal proportional thereto, which signal corresponds to the range between the antenna and the target.

No references cited.

CHESTER L. JUSTUS, *Primary Examiner.*

R. D. BENNETT, *Assistant Examiner.*